Nov. 13, 1956     C. MITCHELL ET AL     2,770,386
MOLDED PLASTIC CONTAINERS AND METHODS OF MAKING THE SAME
Filed Nov. 26, 1954
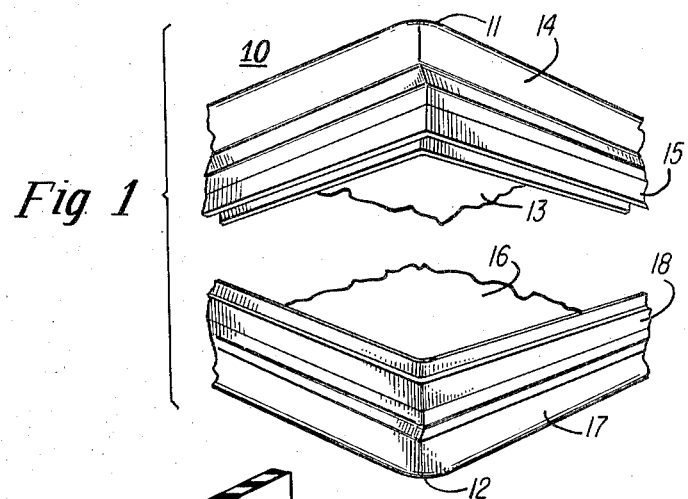
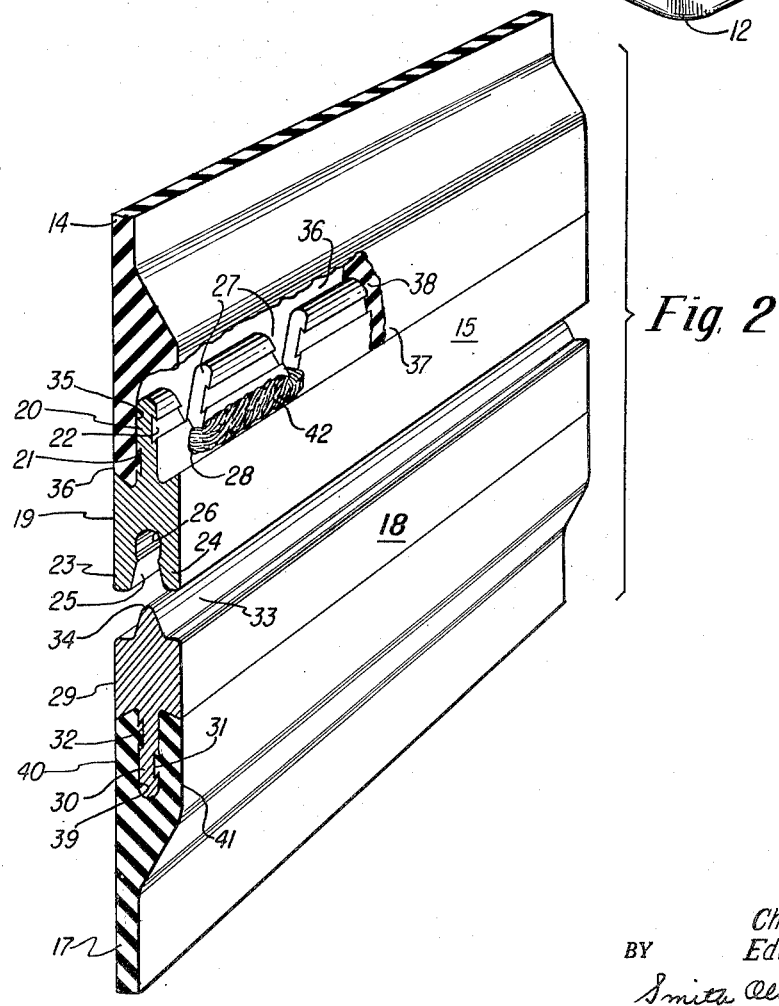
INVENTOR.
Charles Mitchell
Edwin F. Bushman
BY
Smith, Olsen, Baird
& Gulbrandsen, Attys United States Patent Office 2,770,386
Patented Nov. 13, 1956

2,770,386

MOLDED PLASTIC CONTAINERS AND METHODS OF MAKING THE SAME

Charles Mitchell, Lansing, and Edwin F. Bushman, Aurora, Ill., assignors to General American Transportation Corporation, Chicago, Ill., a corporation of New York Application November 26, 1954, Serial No. 471,328

9 Claims. (Cl. 220—4)

The present invention relates to molded plastic containers and methods of making the same; and it is the general object of the invention to provide in a container, or the like, an improved structural combination of a molded plastic wall and a metal strip reinforcing an edge thereof, as well as an improved method of making the structural combination noted.

Another object of the invention is to provide a container comprising a pair of separable complementary shells disposed in facing relation in a closed position, wherein each of the shells includes a boundary wall formed of plastic material and provided with a boundary edge carrying a boundary strip formed of metal, and wherein the boundary strips not only reinforce the edges of the respective boundary walls, but cooperate with each other in the closed position of the shells to seal the container.

Another object of the invention is to provide a container of the character described, wherein hinge mechanism for securing the complementary shells together may be carried by the boundary strips mentioned so as to eliminate the necessity of piercing the boundary walls of the shells that are formed of plastic material.

A further object of the invention is to provide a plastic wall carrying at the edge thereof a metal reinforcing strip, and incorporating an improved arrangement for securing together the parts mentioned so as to provide a simple and rugged structure.

A still further object of the invention is to provide an improved method of making a plastic wall carrying at the edge thereof a metal reinforcing strip, that is simple and economical to carry out and that positively insures secure attachment of the parts mentioned and the production of a rugged structure.

Further features of the invention pertain to the particular arrangement of the elements of the plastic wall carrying at the edge thereof a metal reinforcing strip and of the steps of the method of making the same, whereby the above-outlined and additional operating features are attained.

The invention, both as to its organization and method of operation, together with further objects and advantages thereof, will best be understood by reference to the following specification taken in connection with the accompanying drawing, in which:

Figure 1 is an exploded fragmentary perspective view of the corner of a container, including complementary upper and lower shells, illustrated in partially open position, and embodying the present invention, and made in accordance with the method of the present invention; and Fig. 2 is a greatly enlarged exploded fragmentary sectional and perspective view, partly broken away, of the lower and upper portions of the boundary walls of the respective upper and lower shells of the container shown in Fig. 1, illustrating a step in the method of making the same.

Referring now to Fig. 1 of the drawing, there is illustrated a molded plastic container 10 embodying the features of the present invention, and made in accordance with the method of the present invention, and comprising a pair of separable complementary shells 11 and 12 disposed in facing relation in a closed position, the upper and lower shells 11 and 12 being illustrated in a partially open position. In the container 10, the shells 11 and 12 may be completely removable with respect to each other, or they may be hinged together by hinge mechanism, not shown. The upper shell 11 may be of substantially rectangular form including a top wall 13 and a rectangular boundary wall 14, both formed of a molded plastic material; and the lower boundary edge of the boundary wall 14 carries a boundary reinforcing strip 15 formed of a suitable metal. Specifically, the walls 13 and 14 may be molded of polyester resin reinforced with glass fibers; and the boundary strip 15 may be formed by extrusion of a suitable aluminum alloy, the boundary strip 15 being of female configuration, as explained more fully hereinafter. Similarly, the lower shell 12 may be of substantially rectangular form including a bottom wall 16 and a rectangular boundary wall 17, both formed of a molded plastic material; and the upper boundary edge of the boundary wall 17 carries a boundary reinforcing strip 18 formed of a suitable metal. Specifically, the walls 16 and 17 may be molded of polyester resin reinforced with glass fibers; and the boundary strip 18 may be formed by extrusion of a suitable aluminum alloy, the boundary strip 18 being of male configuration, as explained more fully hereinafter.

As best shown in Fig. 2, the boundary strip 15 is of elongated form and comprises a body 19 that is provided with an upwardly projecting longitudinally extending tongue 20 having lower and upper longitudinally extending grooves 21 and 22 formed therein, each of the grooves 21 and 22 being substantially of dovetail configuration in cross-section and constituting an interference part. Also, the body 19 carries downwardly facing sealing structure including a pair of longitudinally extending and laterally spaced-apart flanges 23 and 24 separated by an upwardly tapered longitudinally extending notch 25 terminating in a substantially elliptical centrally disposed longitudinally extending groove 26. Finally, a plurality of longitudinally spaced-apart substantially V-shaped slots 27 are provided in the tongue 20 that extend laterally therethrough, intersecting the grooves 21 and 22, and terminating in substantially circular holes 28, also extending laterally through the tongue 20 just above the body 19. Similarly, the boundary strip 18 is of elongated form and comprises a body 29 that is provided with a downwardly projecting longitudinally extending tongue 30 having lower and upper longitudinally extending grooves 31 and 32 formed therein, each of the grooves 31 and 32 being substantially of dovetail configuration in cross-section and constituting an interference part. Also, the body 29 carries upwardly facing sealing structure including a single longitudinally extending centrally disposed upwardly tapered ridge 33 terminating in a smooth longitudinally extending crest 34. Finally, a plurality of longitudinally spaced-apart substantially V-shaped slots, not shown, are provided in the tongue 30 that extend laterally therethrough, intersecting the grooves 31 and 32, and terminating in substantially circular holes, not shown, also extending laterally through the tongue 30 just below the body 29.

The tongue 20 of the reinforcing strip 15 projects upwardly into a longitudinally extending and substantially centrally disposed groove 35 formed in the lower edge of the boundary wall 14 and defined by a pair of longitudinally extending and laterally spaced-apart side flanges 36 and 37, the lower portion of the boundary wall 14 being thicker than the upper portion thereof in order to provide a strong connection to the boundary strip 15. The boundary wall 14 and the side flanges 36 and 37 thereof are integrally molded of the previously-mentioned plastic material so that the interference parts are respectively formed integrally with the side flanges 36 and 37 that project into and interlock with the respective grooves 21 and 22 provided in the tongue 20. Also, securing elements or webs 38 of the molded plastic material project laterally through the slots 27 formed in the tongue 20 and integrally join the side flanges 36 and 37 so as firmly further to lock the reinforcing strip 15 in place.

The tongue 30 of the reinforcing strip 18 projects downwardly into a longitudinally extending and substantially centrally disposed groove 39 formed in the upper edge of the boundary wall 17 and defined by a pair of longitudinally extending and laterally spaced-apart side flanges 40 and 41, the upper portion of the boundary wall 17 being thicker than the lower portion thereof in order to provide a strong connection to the boundary strip 18. The boundary wall 17 and the side flanges 40 and 41 thereof are integrally molded of the previously-mentioned plastic material so that interference parts are respectively formed integrally with the side flanges 40 and 41 that project into and interlock with the respective grooves 32 and 31 provided in the tongue 30. Also, securing elements or webs, not shown, of the molded plastic material project laterally through the slots, not shown, formed in the tongue 30 and integrally join the side flanges 40 and 41 so as firmly further to lock the reinforcing strip 18 in place.

Prior to the molding of the plastic boundary wall 14 upon the tongue 20 of the reinforcing strip 15, a roving or cable 42 of glass fibers is threaded in back-and-forth relation through the slots 27 into the holes 28 formed in the tongue 20; and subsequently when the plastic resin is introduced into the mold, it impregnates the roving 42, so that still subsequently, as the side flanges 36 and 37 are molded, the roving 42 is integrally incorporated into the side flanges 36 and 37; which side flanges 36 and 37 also comprise, in addition to the plastic resin, suitable reinforcing glass fiber performs or rovings, not shown, and as explained more fully hereinafter in conjunction with the molding method. Similarly, prior to the molding of the plastic boundary wall 17 upon the tongue 30 of the reinforcing strip 18, a roving or cable, not shown, of glass fibers is threaded in back-and-forth relation through the slots, not shown, into the holes, not shown, formed in the tongue 30; and subsequently when the plastic resin is introduced into the mold, it impregnates the roving mentioned, so that still subsequently, as the side flanges 40 and 41 are molded, the roving mentioned is integrally incorporated into the side flanges 40 and 41; which side flanges 40 and 41 also comprise, in addition to the plastic resin, suitable reinforcing glass fiber preforms or rovings, not shown, and as explained more fully hereinafter in conjunction with the molding method.

Turning now to the method of making the container 10, the steps involved in the fabrication of the upper and lower shells 11 and 12 are substantially identical; whereby, in the interest of brevity, only those steps involved in the fabrication of the upper shell 11 are described in detail below. More particularly, in making the upper shell 11 a suitable length of the extruded aluminum alloy of the female configuration is pierced to provide the longitudinally spaced-apart slots 27 and holes 28 in the tongue 20 thereof; and then an appropriate length of the slotted extrusion is cut and then formed into the substantially rectangular configuration of the reinforcing strip 15 the adjacent ends of the reinforcing strip 15 being suitably welded together. Then a suitable length of the roving 42 of glass fibers is threaded in back-and-forth relation into the openings 28 through the slots 27 provided in the tongue 20 of the reinforcing strip 15. Following this subassembly, the reinforcing strip 15, supporting the attached roving 42, is placed and supported in position in the male part of a conventional die set. Glass fiber rovings or chopped glass fiber preforms are then placed over and around the tongue 20 and the roving 42 leaving the body 19 of the reinforcing strip 15 exposed. Molding resin is then delivered to the preformed subassembly and the female die is moved into position so that the press is closed. Of course, the die set is subjected to suitable temperature and pressure throughout an appropriate time interval to effect a molding of the plastic resin and the subsequent curing thereof in a manner well understood in the plastic molding art. Thereafter, and following the cure of the resin, the press is opened, and the finished upper shell 11 is removed therefrom. As explained above, in the molding operation, the glass fiber rovings or chopped glass fiber preforms are integrally incorporated into and become a reinforcing part of the flanges 36 and 37 and the walls 13 and 14; and further the cable 42 is integrally incorporated into the flanges 36 and 37, whereby the upper shell 11 comprises a unitary composite structure.

As previously noted, the lower shell 12 is formed in a substantially identical manner employing the reinforcing strip 18 of male configuration.

Thereafter, the formed upper and lower shells 11 and 12 are assembled to produce the composite container 10, and at this time an elongated gasket, not shown, may be arranged in the groove 26 provided in the reinforcing strip 15 so that when the shells 11 and 12 are moved into a completely closed position the crest 34 of the ridge 33 engages the gasket mentioned so as to provide a water-tight seal between the reinforcing strips 15 and 18. Also in the container 10, the surfaces of the sides flanges 36 and 37 are substantially flush with the respective sides of the reinforcing strip 15, while the surfaces of the side flanges 40 and 41 are substantially flush with the respective sides of the reinforcing strip 18; and the reinforcing strips 15 and 18 have substantially the same thickness, so as to provide a smooth joint between the shells 11 and 12 in closed position.

In the molding of the upper and lower shells 11 and 12, a wide variety of molding resins may be employed, but it is preferable to employ polyester resin as a matter of economy and simplicity. For example, the polyester resin essentially comprises condensation products made from dibasic acids and glycols, the dibasic acids used, in part, being unsaturated; maleic or fumaric being the most commonly used acids. In addition, a second component is included in the final composition in the form of a polymerizable monomer, such as vinyl acetate, methyl methacrylate, or most commonly styrene. Under the influence of suitable heat and a suitable catalyst, polymerization occurs producing a thermoset solid, and in this change the linear unsaturated polyester chains are cross-linked by the reactive monomer. Many of these moldable resins for the production of plastic articles are commercially available on the market and are suitable in carrying out the present method. Of course, other types of molding resins may be employed in a manner well understood in the plastic molding art. In the molding of certain of these resins, relatively high temperatures and relatively high pressures are ordinarily employed to effect the cure; however, in the molding of other of these resins cures may be effected at atmospheric pressure or below and at room temperature.

For purpose of description, the container 10 was illustrated as being of substantially rectangular form, but of course, it will be understood that it may be substantially cylindrical or of any other desirable form. While the reinforcing strips 15 and 18 were described as being formed by extrusion of a suitable aluminum alloy, it will be understood that these strips may be formed of brass, or other copper alloy, or of other materials, including stainless steel, cold rolled steel, etc. Moreover, the edge reinforcing strips 15 and 18 may be formed by extrusion or molding utilizing plastic compositions, such as rubber, polyethylene, nylon, fluoroethylene, styrene copolymers, vinyl copolymers, etc. Furthermore, the tongue 20 of the reinforcing strip 15 is described as having the "keyhole slots" 27—28 therein; however, it will be understood that these slots need not necessarily be of such configuration, and, in fact, piercings or other holes provided through the tongue 20 will serve the purpose of accommodating the connecting links 38 between the flanges 36 and 37. Further, the cable 42 that is secured in place in the slots 27—28 provided in the tongue 20 of the reinforcing strip 15 has been described as being formed of a roving of glass fibers, but it will be understood that this cable 42 may be formed of a wide variety of other materials, such, for example, as natural fibers (sisal, etc.) or synthetic plastic fibers, etc.; and, in fact, this cable or structure may take the form of a ribbon or screen of metal, or the like, secured in the slots 27—28 in the tongue 20.

Finally, in the event it is desirable to secure the shells 11 and 12 together, the required hinge and latch mechanisms may be directly secured to the reinforcing strips 15 and 18, thereby eliminating the necessity of providing piercings in the plastic walls 14 and 17.

In view of the foregoing description, it will be understood that there has been provided both a molded plastic container of improved construction and arrangement, as well as an improved method of making the same, wherein the plastic boundary wall of the complementary shells of the container carry metal reinforcing strips, that also serve as sealing strips in engaged relation with each other when the shells occupy their closed positions, so as to render the container completely water-tight. The container is of exceedingly strong and rugged construction, yet of lightweight, and is admirably suited to utilization as a packing case, as luggage, etc.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a container or the like, the combination comprising a shell including an elongated boundary wall provided with an elongated marginal edge having an elongated and longitudinally extending groove therein defining a pair of elongated and longitudinally extending side flanges disposed in laterally spaced-apart relation, an elongated and longitudinally extending reinforcing strip carried upon the marginal edge of said wall and provided with an elongated and longitudinally extending body disposed outwardly of said groove and carrying an elongated and longitudinally extending tongue projecting inwardly into said groove, the thickness of said wall between the opposite and laterally spaced-apart outer surfaces of said side flanges being substantially equal to the thickness of said body between the opposite and laterally spaced-apart outer surfaces thereof, the opposite outer surfaces of said side flanges and the opposite outer surfaces of said body being respectively disposed substantially flush with each other so as to provide respective smooth junctions therebetween, said tongue having a plurality of longitudinally spaced-apart holes extending laterally therethrough, and a plurality of longitudinally spaced-apart securing elements extending laterally through said holes and interconnecting said side flanges, said wall and said side flanges and said securing elements being of integral structure and formed of molded plastic material embedding said tongue and securely anchoring said strip in place.

2. The container combination set forth in claim 1, wherein said molded plastic material consists essentially of glass-fiber reinforced polyester resin of the thermosetting type, and said strip consists essentially of a length of aluminum alloy.

3. The container combination set forth in claim 1, and further comprising an elongated and longitudinally extending sealing element carried on the outer edge of said body and formed integrally therewith.

4. The container combination set forth in claim 1, wherein the opposite and laterally spaced-apart sides of said tongue respectively carry elongated and longitudinally extending first elements formed integrally therewith, wherein the opposite inner surfaces of said side flanges respectively carry elongated and longitudinally extending second elements formed integrally therewith, and wherein said first elements are respectively disposed in interfitting relationship with said second elements.

5. In combination, a wall provided with an elongated edge having a longitudinally extending groove therein defining a pair of laterally spaced-apart side flanges, an elongated strip carried upon the edge of said wall and provided with a longitudinally extending tongue projecting into said groove, said tongue having a plurality of longitudinally spaced-apart holes extending laterally therethrough, and a cable carried by said tongue in threaded back-and-forth relation through said holes, said wall and said side flanges being of integral structure and formed of molded plastic material embedding both said tongue and said cable and securely anchoring said strip in place.

6. In combination, a wall provided with an elongated edge having a longitudinally extending groove therein defining a pair of laterally spaced-apart side flanges, an elongated metal strip carried upon the edge of said wall and provided with a longitudinally extending tongue projecting into said groove, said tongue having a plurality of longitudinally spaced-apart holes extending laterally therethrough, and a cable threaded back-and-forth through said holes, said cable being formed essentially of glass fibers, said wall and said side flanges being formed essentially of molded polyester resin of the thermosetting type reinforced with glass fibers and impregnating said cable, whereby said wall and said side flanges and said cable constitute an integral structure securely anchoring said strip in place.

7. A container comprising a pair of separable complementary shells disposed in facing relation in a closed position; each of said shells including an elongated boundary wall provided with an elongated marginal edge having an elongated and longitudinally extending groove therein defining a pair of elongated and longitudinally extending side flanges disposed in laterally spaced-apart relation, an elongated and longitudinally extending metal reinforcing strip carried upon the marginal edge of said wall and provided with an elongated and longitudinally extending body disposed outwardly of said groove and carrying an elongated and longitudinally extending tongue projecting inwardly into said groove, the thickness of said wall between the opposite and laterally spaced-apart outer surfaces of said side flanges being substantially equal to the thickness of said body between the opposite and laterally spaced-apart outer surfaces thereof, the opposite outer surfaces of said side flanges and the opposite outer surfaces of said body being respectively disposed substantially flush with each other so as to provide respective smooth junctions therebetween, said tongue having a plurality of longitudinally spaced-apart holes extending laterally therethrough, and a plurality of longitudinally spaced-apart securing elements extending laterally through said holes and interconnecting said side flanges, said wall and said side flanges and said securing elements being of integral structure and formed of molded plastic material embedding said tongue and securely anchoring said strip in place; said reinforcing strips respectively carried upon the marginal edges of said walls respectively carrying elongated and longitudinally extending engaging parts providing an elongated and longitudinally extending seal therebetween when said shells are in closed position.

8. The method of making a plastic wall provided with an elongated edge carrying an elongated metal reinforcing strip, comprising providing an elongated metal reinforcing strip including a body carrying a longitudinally extending tongue having a plurality of longitudinally spaced-apart holes extending laterally therethrough, supporting a cable on said tongue in threaded back-and-forth relation through said holes, supporting said strip with said cable in place in a mold, placing a quantity of molding resin in said mold adjacent to said strip and embedding said tongue and said cable and leaving said body exposed, and subjecting said resin to suitable temperature and pressure in said mold during a time interval in order to effect molding thereof to define said plastic wall carrying at the edge thereof a pair of integral longitudinally extending and laterally spaced-apart side flanges respectively disposed on opposite sides of said tongue and embedding the same together with said cable and intimately bonded to said cable so as securely to anchor said reinforcing strip in place.

9. The method of making a plastic wall provided with an elongated edge carrying an elongated metal reinforcing strip, comprising providing an elongated metal reinforcing strip including a body carrying a longitudinally extending tongue having a plurality of longitudinally spaced-apart holes extending laterally therethrough, supporting a cable formed essentially of glass fibers on said tongue in threaded back-and-forth relation through said holes, supporting said strip with said cable in place in a mold, placing a quantity of glass fibers and a quantity of polyester resin of the thermosetting type in said mold adjacent to said strip and embedding said tongue and said cable and leaving said body exposed, and subjecting said resin to suitable temperature and pressure in said mold during a time interval in order to effect molding thereof to define said plastic wall carrying at the edge thereof a pair of integral longitudinally extending and laterally spaced-apart side flanges disposed on opposite sides of said tongue and embedding the same together with said cable and impregnating said cable and intimately bonded thereto so as securely to anchor said reinforcing strip in place.

References Cited in the file of this patent

UNITED STATES PATENTS

| 2,166,798 | Cote | July 18, 1939 |
| 2,285,219 | Morrell | June 2, 1942 |
| 2,285,220 | Morrell | June 2, 1942 |
| 2,351,387 | Anderson | June 13, 1944 |
| 2,512,105 | Kooji et al. | June 20, 1950 |

FOREIGN PATENTS

| 107,701 | Great Britain | July 12, 1917 |